US012077409B2

(12) United States Patent
Gou

(10) Patent No.: US 12,077,409 B2
(45) Date of Patent: Sep. 3, 2024

(54) CONTROL SYSTEM, ELEVATOR SYSTEM AND CONTROL METHOD FOR MACHINE PASSENGERS

(71) Applicant: Otis Elevator Company, Farmington, CT (US)

(72) Inventor: Xingang Gou, Tianjin (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1196 days.

(21) Appl. No.: 16/831,941

(22) Filed: Mar. 27, 2020

(65) Prior Publication Data

US 2021/0078823 A1 Mar. 18, 2021

(30) Foreign Application Priority Data

Sep. 18, 2019 (CN) ......................... 201910880177.8

(51) Int. Cl.
*B66B 1/24* (2006.01)
*B66B 1/34* (2006.01)

(52) U.S. Cl.
CPC .......... *B66B 1/2408* (2013.01); *B66B 1/3476* (2013.01); *B66B 2201/215* (2013.01); *B66B 2201/222* (2013.01)

(58) Field of Classification Search
CPC ............ B66B 1/468; B66B 2201/4615; B66B 1/3461; B66B 2201/4653; B66B 1/2408; B66B 2201/4638; B66B 1/3446; B66B 2201/4661; B66B 2201/104; B66B 2201/405; B66B 2201/4607; B66B 17/20; B66B 2201/242; B66B 9/16
See application file for complete search history.

(56) References Cited

U.S. PATENT DOCUMENTS

| | | | |
|---|---|---|---|
| 4,279,563 | A | 7/1981 | Miller |
| 9,952,589 | B1 | 4/2018 | Brazeau |

(Continued)

FOREIGN PATENT DOCUMENTS

| | | | |
|---|---|---|---|
| CN | 105035893 | A | 11/2015 |
| CN | 107487689 | A | 12/2017 |

(Continued)

OTHER PUBLICATIONS

Chinese Office Action for Application No. 201910880177.8; Issued Mar. 23, 2023; 10 Pages.

(Continued)

*Primary Examiner* — Marlon T Fletcher
(74) *Attorney, Agent, or Firm* — CANTOR COLBURN LLP

(57) ABSTRACT

An elevator control system, an elevator system, and a control method therefor. The elevator control system includes: a data collection unit configured to receive a call request signal from a machine passenger at each landing, and receive information about the machine to ride the elevator sent by the machine passenger; and a control unit configured to determine whether to accept the call request from the machine passenger based on elevator operating condition and the information about the machine to ride the elevator, and send information about the rules of riding the elevator to the machine passenger after accepting its call request.

19 Claims, 1 Drawing Sheet

(56) References Cited

U.S. PATENT DOCUMENTS

| | | | | |
|---|---|---|---|---|
| 2012/0041593 | A1* | 2/2012 | Ichinose | B66B 1/2458 700/258 |
| 2018/0218060 | A1 | 8/2018 | Guron et al. | |
| 2022/0402724 | A1* | 12/2022 | Jeong | B66B 1/2408 |

FOREIGN PATENT DOCUMENTS

| | | | | |
|---|---|---|---|---|
| CN | 108275522 | A | 7/2018 | |
| CN | 108375975 | A | 8/2018 | |
| CN | 109447547 | A | 3/2019 | |
| CN | 109552953 | A | 4/2019 | |
| EP | 3480154 | A1 | 5/2019 | |
| JP | S59153213 | A | 9/1984 | |
| JP | 2004149251 | A | 5/2004 | |
| JP | 2007076788 | A | 3/2007 | |
| JP | 4089956 | B2 | 5/2008 | |
| JP | 5003573 | B2 | 8/2012 | |
| JP | 5473477 | B2 | 4/2014 | |
| JP | 2017220122 | A | 12/2017 | |
| JP | 6308341 | B1 * | 4/2018 | B66B 1/14 |
| JP | 2019099327 | A * | 6/2019 | |
| KR | 20100080278 | A | 7/2010 | |
| KR | 102548844 | B1 * | 6/2023 | |
| WO | 2014156458 | A1 | 10/2014 | |
| WO | 2018066057 | A1 | 4/2018 | |

OTHER PUBLICATIONS

European Search Report for Application No. 20165004.1; Issued Sep. 17, 2020; 7 Pages.

* cited by examiner

CONTROL SYSTEM, ELEVATOR SYSTEM AND CONTROL METHOD FOR MACHINE PASSENGERS

FOREIGN PRIORITY

This application claims priority to Chinese Patent Application No. 201910880177.8, filed Sep. 18, 2019, and all the benefits accruing therefrom under 35 U.S.C. § 119, the contents of which in its entirety are herein incorporated by reference.

FIELD OF THE INVENTION

The present application relates to the field of elevators, and in particular to a control system for an elevator system and a control method therefor.

BACKGROUND OF THE INVENTION

As a tool to facilitate passengers' walking between landings or shorten passengers' walking distance, passenger transport devices are very common in daily life. As an example, the most commonly seen ones are escalators and elevators generally used between the floors of commercial buildings, and moving walkways generally used in large airports.

At the same time, with the development of Internet technology and machine intelligence technology, automatic machines with a certain degree of intelligence also appear in daily life, such as delivery vehicles, take-out food robots, food delivery robots, package delivery robots, and the like. It is inevitable for those automatic machines to use elevators in various buildings when performing their functional duties.

Therefore, the development of technologies focused on realizing the interaction between elevator systems and these machine passengers has become the hot spot in the industry. However, it should also be noted that the most common users of elevator systems are still human passengers. Therefore, how to maintain or improve the good elevator-riding experience of human passengers while receiving machine passengers to ride the elevators together has become a technical problem to be solved.

SUMMARY OF THE INVENTION

The present application provides an elevator control system, an elevator system, and a control method therefor, so as to maintain or improve the good elevator riding experience of human passengers while receiving machine passengers to ride the elevators together.

To achieve at least one object of the present application, in accordance with one aspect of the present application, an elevator control system is provided, comprising: a data collection unit configured to: receive a call request signal from a machine passenger at each landing, and receive information about the machine to ride the elevator sent by the machine passenger; and a control unit configured to: determine whether to accept the call request from the machine passenger based on the elevator operating condition and the information about the machine to ride the elevator, and send information about the rules of riding the elevator to the machine passenger after accepting its call request.

Optionally, the information about the rules of riding the elevator comprises parking position information for instructing the machine passenger to move to a preset parking position in the car upon entrance, after the call request from the machine passenger is accepted.

Optionally, the information about the rules of riding the elevator further comprises locking position information for instructing the machine passenger to move to a preset parking position in the car upon entrance and connect with a preset locking device, after the call request from the machine passenger is accepted.

Optionally, the parking position information comprises a parking identifier for indicating the preset parking position, and the machine passenger moves to the preset parking position in the car according to the instruction of the parking identifier.

Optionally, the information about the rules of riding the elevator further comprises landing prohibition information for instructing the machine passenger not to leave the car from a preset landing upon entrance, after the call request from the machine passenger is accepted.

Optionally, the information about the rules of riding the elevator further comprises human passenger high priority information for instructing the machine passenger to enter or leave the car later than the human passenger, after the call request from the machine passenger is accepted.

Optionally, when the car has more than one doors, the information about the rules of riding the elevator further comprises car door indication information for instructing the machine passenger to enter or leave the car via the preset car door, after the call request from the machine passenger is accepted.

Optionally, the elevator operating condition comprises: a maximum load of the car and a current load of the car, and/or a maximum volume of the car and a current volume of the car; and/or the information about the machine to ride the elevator comprises: size information of the machine passenger and/or weight information of the machine passenger.

Optionally, when the data collection unit and the control unit are communicatively connected to a plurality of cars respectively, the elevator operating condition further comprises the number of currently available cars that are one or more of: the cars that do not currently carry a passenger, the cars that do not have a human passenger call request at each landing, or the cars that do not have input information of a particular human passenger indicating refusal to ride the elevator together with the machine passenger.

Optionally, the control unit is further configured to: determine whether to accept the call request from the machine passenger based on the input information of a particular human passenger. When the input information of the particular human passenger indicates refusal to ride the elevator together with the machine passenger, the call request from the machine passenger is rejected.

Optionally, the particular human passenger comprises: a human passenger currently located in the car being called, and/or a human passenger currently calling the same car as a machine passenger.

Optionally, the machine passenger comprises a transport vehicle capable of controlled autonomous movement or a robot capable of controlled autonomous movement.

Optionally, the control unit is further configured to: send, to the human passenger in the car assigned to receive the machine passenger, a prompt message indicating an upcoming machine passenger to ride the car, when the call request from the machine passenger is accepted.

In order to achieve at least one object of the present application, according to another aspect of the present application, an elevator system is further provided, comprising: at least one car; a control machine room; and the elevator control system as described above, wherein the elevator control system is integrally disposed in the control machine room, or the elevator control system is separately disposed in each of the cars and the control machine room.

To achieve at least one object of the present application, according to still another aspect of the present application, a control method for an elevator system is further provided, comprising: receiving a call request signal from a machine passenger at each landing, and receiving information about the machine to ride the elevator sent by the machine passenger; and determining whether to accept the call request from the machine passenger based on the elevator operating condition and the information about the machine to ride the elevator, and sending information about the rules of riding the elevator to the machine passenger after accepting its call request.

Optionally, the information about the rules of riding the elevator sent to the machine passenger comprises: parking position information for instructing the machine passenger to move to a preset parking position in the car upon entrance; and/or landing prohibition information for instructing the machine passenger not to leave the car from a preset landing upon entrance; and/or human passenger high priority information for instructing the machine passenger to enter or leave the car later than the human passenger; and/or car door indication information for instructing the machine passenger to enter or leave the car via a preset car door when the car has more than one doors.

Optionally, the parking position information further comprises: locking position information for instructing the machine passenger to move to the preset parking position in the car upon entrance and connect with a preset locking device, and/or a parking identifier for instructing the machine passenger to move to the preset parking position in the car upon entrance.

Optionally, the elevator operating condition comprises: a maximum load of the car and a current load of the car, and/or a maximum volume of the car and a current volume of the car; and/or the information about the machine to ride the elevator comprises: size information of the machine passenger and/or weight information of the machine passenger.

Optionally, when the data collection unit and the control unit are communicatively connected to a plurality of cars respectively, the elevator operating condition further comprises the number of currently available cars that are one or more of: the cars that do not currently carry a passenger, the cars that do not have a human passenger call request at each landing, or the cars that do not have input information of a particular human passenger indicating refusal to ride the elevator together with the machine passenger.

Optionally, further comprising: determining whether to accept the call request of the machine passenger based on the input information of a particular human passenger, wherein when the input information of the particular human passenger indicates refusal to ride the elevator together with the machine passenger, the call request from the machine passenger is rejected.

Optionally, the particular human passenger comprises: a human passenger currently located in a car being called, and/or a human passenger currently calling the same car as a machine passenger.

Optionally, the control method further comprising: sending, to the human passenger in the car assigned to receive the machine passenger, a prompt message indicating an upcoming machine passenger to ride the car, when the call request from the machine passenger is accepted.

According to the elevator control system, the elevator system, and the control method therefor of the present application, the first step is to determine whether to accept the call request from the machine passenger based on the elevator operating condition and the information about the machine to ride the elevator to complete the first screening process, so as to avoid uncomfortable user experience such as overload or over-congestion of the elevator and potential safety hazards; second, even after accepting the call request from the machine passenger, information about the rules of riding the elevator will still be sent to the machine passenger to provide normative guidance on how it shall behave when riding the elevator, which in turn ensures the riding experience of human passengers.

DETAILED DESCRIPTION OF THE EMBODIMENT(S) OF THE INVENTION

Figure 1:
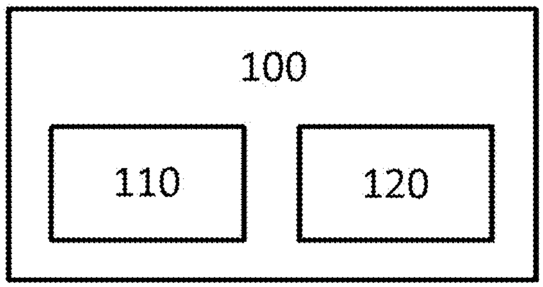
FIG. 1 is a schematic diagram of one embodiment of an elevator control system.

The present application describes herein an embodiment of an elevator control system in conjunction with FIG. 1. Referring to FIG. 1, the elevator control system 100 at least comprises two parts of a data collection unit 110 and a control unit 120, wherein the data collection unit is configured to collect relevant data information for processing a call request from a machine passenger by the elevator control system, so as to support the control system to make a judgment accordingly. Specifically, the data collection unit is configured to receive a call request signal from a machine passenger at each landing to confirm that there is a current need for the machine passenger to use the elevator. The data collection unit is further configured to receive information about the machine to ride the elevator sent by the machine passenger, so that the elevator control system can get the basic data information of the machine passenger to assist in the judgment. For example, the information about the machine to ride the elevator comprises: one or more of the size information of the machine passenger or weight information of the machine passenger, so that the elevator control system can get to know whether the current remaining load and space of the car are sufficient to accommodate the machine passenger.

In addition, the control unit of the elevator control system is configured to analyze the collected data information and provide control results accordingly. Specifically, the control unit is configured to determine whether to accept the call request from the machine passenger based on the elevator operating condition and the information about the machine to ride the elevator. The elevator operating condition described herein refers to the information about the elevator's capability to continue to carry passengers. For example, it may include a maximum load and a current load of the car, according to which the weight that can still be carried by the car is obtained. As another example, the elevator operating condition may include a maximum volume and a current volume of the car, according to which it can be obtained a machine passenger of how much volume or how much occupied space can still be carried by the car. Additionally, the control unit is further configured to send information about the rules of riding the elevator to the machine passenger after accepting its call request, to provide normative guidance on how the machine passenger shall behave for the sake of improving the experience of sharing an elevator between the human passenger and the machine passenger.

Under such a configuration, the elevator control system of the embodiment may first determine whether to accept the call request from the machine passenger based on the elevator operating condition and the information about the machine to ride the elevator to complete the first screening process, so as to avoid uncomfortable user experience such as overload or over-congestion of the elevator and potential safety hazards. Second, even after accepting the call request from the machine passenger, information about the rules of riding the elevator will still be sent to the machine passenger to provide normative guidance on how it shall behave when riding the elevator, which in turn ensures the riding experience of human passengers.

Based on the foregoing embodiment, modifications may further be made to various aspects of the elevator control system, as will be exemplified below.

For example, for the information about the rules of riding the elevator by which the machine passenger is regulated, it may comprise elevator-riding behavior regulations established for the machine passenger from a plurality of perspectives. For example, the information about the rules of riding the elevator comprises the parking position information for instructing the machine passenger to move to a preset parking position in the car upon entrance, after the call request from the machine passenger is accepted. That is, the elevator control system assigns a dedicated preset parking position to the machine passenger in the case where there is available space in the car, to prevent the machine passenger from causing troubles, such as collisions, to the surrounding human passengers after it is parked in the car. More specifically, the parking position information herein may further comprise a parking identifier for indicating the preset parking position, and the machine passenger moves to the preset parking position in the car according to the instruction of the parking identifier. At the same time, the identifier is also easily identified by human passengers. When there is sufficient space in the car, the position with the parking identifier can be reserved for the machine passenger, so that human beings and machines can be separated from each other from the very beginning.

Based on the above, the information about the rules of riding the elevator may further comprise locking position information for instructing the machine passenger to move to a preset parking position in the car upon entrance and connect with a preset locking device, after the call request from the machine passenger is accepted. The locking position information at this time not only specifies a dedicated preset parking position for the machine passenger, but also sets a corresponding locking device at this position, so that the machine passenger can be fixed by the locking device when riding the elevator, thereby preventing it from causing collisions or safety accidents to the surrounding human passengers due to displacement under various abnormal elevator operating conditions (such as sudden fall, rebound, overshoot, etc.).

As another example, the information about the rules of riding the elevator may further comprise landing prohibition information for instructing the machine passenger not to leave the car from a preset landing upon entrance, after the call request from the machine passenger is accepted, in an effort to prevent the machine passenger from entering undesired landings so as to protect the privacy of human passengers as much as possible.

As still another example, the information about the rules of riding the elevator may further comprise human passenger high priority information for instructing the machine passenger to enter or leave the car later than the human passenger, after the call request from the machine passenger is accepted, so as to avoid bad elevator-riding experience to human passengers brought by obstructing them by the machine passenger.

As further another example, when the car has more than one doors, the information about the rules of riding the elevator may further comprise car door indication information for instructing the machine passenger to enter or leave the car via the preset car door, after the call request from the machine passenger is accepted, so that the human beings and machines can be separated from the very beginning, thereby improving efficiency and human passengers' elevator riding experience.

In addition, in another common scenario, an existing application scenario may normally have multiple cars operating simultaneously, and a uniform elevator control system is provided for the cars. At this time, the data collection unit and the control unit of the elevator control system are communicatively connected to a plurality of cars respectively, and the elevator operating condition should further include the number of currently available cars that are one or more of: the cars that do not currently carry a passenger, the cars that do not have a human passenger call request at each landing, or the cars that do not have input information of a particular human passenger indicating refusal to ride the elevator together with the machine passenger, so that these available cars can be assigned for use by machine passengers under different circumstances, while at the same time taking into account the elevator riding experience of human passengers.

Furthermore, in order to further ensure the elevator riding experience of human passengers, a particular human passenger may also be given some authority. Upon receipt of a call request from a machine passenger, the elevator control system can, even if other requirements for riding the elevator of the machine passenger are met, still forward the corresponding information to the particular human passenger, and accept input information from the particular human passenger. At this time, the control unit is further configured to determine whether to accept the call request from the machine passenger based on the input information of the particular human passenger. When the input information of the particular human passenger indicates refusal to ride the elevator together with the machine passenger, the call request from the machine passenger is rejected. Specifically, the particular human passenger may comprise: a human passenger currently located in the car being called, and/or a human passenger currently calling the same car as a machine passenger. According to the input information of the specific human passenger, the machine passenger can be refused to use the elevator even if the load and volume of the car are sufficient. The reasons for refusal of the particular human passenger may come from other considerations. For example, the particular human passenger is currently in a hurry, while the current machine passenger acts slowly in responding and executing the elevator riding process, thereby causing a conflict of time, and the like.

Likewise, to further ensure the elevator riding experience of human passengers, the control unit may further be configured to: send, to the human passenger in the car assigned to receive the machine passenger, a prompt message indicating an upcoming machine passenger to ride the car, when the call request from the machine passenger is accepted. Such a configuration allows the human passenger to be informed of the upcoming machine passenger before it enters the elevator, thereby making it possible for the human passenger to keep away from the machine passenger or to avoid rushing out of the elevator, so as to avoid a dangerous or uncomfortable experience.

Wherein, as specific examples of the machine passenger mentioned in the foregoing embodiment, it may be a transport vehicle capable of controlled autonomous movement, or a robot capable of controlled autonomous movement, such as take-out food robots, food delivery robots, package delivery robots, and the like.

Figure 2:
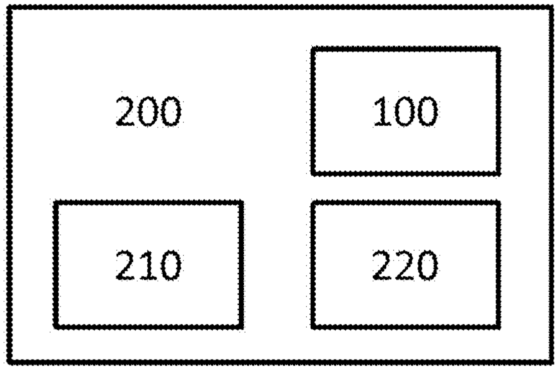
FIG. 2 is a schematic diagram of one embodiment of an elevator system.

Further, the present application also describes herein an embodiment of an elevator system 200 in conjunction with FIG. 2. The elevator system may first comprise an elevator control system in any of the foregoing embodiments or combinations thereof. In addition, it may also comprise at least one car 210 and a control machine room 220. Wherein, the included elevator control system 100 may be integrally disposed in the control machine room, or may be separately disposed in each of the cars and the control machine room. For example, the data collection unit of the elevator control system is located in each car, while the control unit is located in the control machine room. As another example, the elevator control system may further comprise a data acquisition unit having a camera for confirming that the current call request issued from the button is from a machine passenger. Alternatively, the machine passenger can communicate directly with the elevator control system to place a call request. The elevator system with such a configuration can also provide double protection for the shared use of elevator between the human passenger and the machine passenger: the first step is to determine whether to accept the call request from the machine passenger based on the elevator operating condition and the information about the machine to ride the elevator to complete the first screening process, so as to avoid uncomfortable user experience such as overload or over-congestion of the elevator and potential safety hazards; second, even after accepting the call request from the machine passenger, information about the rules of riding the elevator will still be sent to the machine passenger to provide normative guidance on how it shall behave when riding the elevator, which in turn ensures the riding experience of human passengers.

Figure 3:
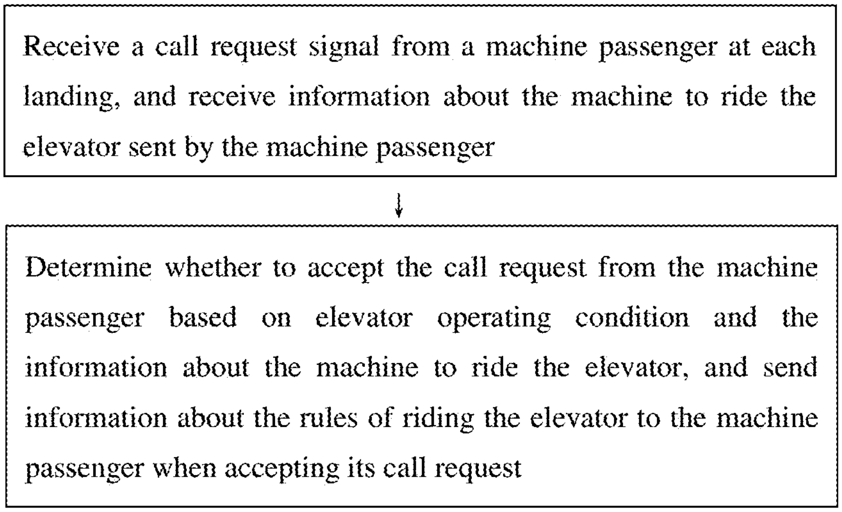
FIG. 3 is a schematic diagram of one embodiment of a control method for an elevator system.

Still further, the present application also describes herein an embodiment of a control method for an elevator system in conjunction with FIG. 3. The control method comprises the steps of: receiving a call request signal from a machine passenger at each landing to confirm that there is a current need for the machine passenger to use the elevator; and receiving information about the machine to ride the elevator sent by the machine passenger, so that the elevator control system can understand the basic data information of the machine passenger to assist it in making a judgment accordingly. For example, the information about the machine to ride the elevator comprises one or more of the size information or weight information of the machine passenger, so that the elevator control system can get the knowledge about whether the current remaining load and space of the car are sufficient to accommodate the machine passenger.

The control method further comprises the step of determining whether to accept the call request from the machine passenger based on the elevator operating condition and the information about the machine to ride the elevator. The elevator operating condition described herein refers to the information about the elevator's capability to continue to carry passengers. For example, it may include a maximum load and a current load of the car, according to which the weight that can still be carried by the car is obtained. As another example, the elevator operating condition may include a maximum volume and a current volume of the car, according to which it can be obtained a machine passenger of how much volume or how much occupied space can still be carried by the car. Thereafter, the step further comprises sending information about the rules of riding the elevator to the machine passenger after accepting its call request, to provide normative guidance on how the machine passenger shall behave for the sake of improving the experience of sharing an elevator between the human passenger and the machine passenger.

Under such a configuration, the control method for the elevator system of the embodiment may first determine whether to accept the call request from the machine passenger based on the elevator operating condition and the information about the machine to ride the elevator to complete the first screening process, so as to avoid uncomfortable user experience such as overload or over-congestion of the elevator and potential safety hazards. Second, even after accepting the call request from the machine passenger, information about the rules of riding the elevator will still be sent to the machine passenger to provide normative guidance on how it shall behave when riding the elevator, which in turn ensures the riding experience of human passengers.

Based on the foregoing embodiment, modifications may further be made to various aspects of the control method, as will be exemplified below.

For example, for the information about the rules of riding the elevator by which the machine passenger is regulated, it may comprise elevator-riding behavior regulations established for the machine passenger from a plurality of perspectives. The information about the rules of riding the elevator may comprise parking position information for instructing the machine passenger to move to a preset parking position in the car upon entrance, and the parking position information may, in more detail, further comprise locking position information for instructing the machine passenger to move to a preset parking position in the car upon entrance and connect with a preset locking device, or a parking identifier for instructing the machine passenger to move to a preset parking position in the car upon entrance. The information about the rules of riding the elevator may further comprise one or more of: landing prohibition information for instructing the machine passenger not to leave the car from a preset landing upon entrance; human passenger high priority information for instructing the machine passenger to enter or leave the car later than the human passenger; and car door indication information for instructing the machine passenger to enter or leave the car via the preset car door when the car has more than one doors. The various rules of riding the elevator as mentioned above play a similar role in regulating the behaviors of the machine passenger when riding the elevator in the embodiment of the control method as in the embodiment of the elevator control system described above, and therefore will not be described herein.

In addition, in another common scenario, an existing application scenario may normally have multiple cars operating simultaneously, and these cars are uniformly controlled via a certain elevator control system. At this time, the data collection unit and the control unit of the elevator control system are communicatively connected to a plurality of cars respectively, and the elevator operating condition should further include the number of currently available cars that are one or more of: the cars that do not currently carry a passenger, the cars that do not have a human passenger call request at each landing, or the cars that do not have input information of a particular human passenger indicating refusal to ride the elevator together with the machine passenger, so that these available cars can be assigned for use by machine passengers under different circumstances, while at the same time taking into account the elevator riding experience of human passengers.

Further, in order to further ensure the elevator riding experience of human passengers, a particular human passenger may also be given some authority. Upon receipt of a call request from a machine passenger, the elevator control system can, even if other requirements for riding the elevator of the machine passenger are met, still forward the corresponding information to the particular human passenger, and accept input information from the particular human passenger. The method further includes: determining whether to accept the call request from the machine passenger based on the input information of the particular human passenger, wherein when the input information of the particular human passenger indicates refusal to ride the elevator together with the machine passenger, the call request from the machine passenger is rejected. Specifically, the particular human passenger may comprise: a human passenger currently located in the car being called, and/or a human passenger currently calling the same car as a machine passenger. According to the input information of the specific human passenger, the machine passenger can be refused to use the elevator even if the load and volume of the car are sufficient. The reasons for refusal of the particular human passenger may come from other considerations. For example, the particular human passenger is currently in a hurry, while the current machine passenger acts slowly in responding and executing the elevator riding process, thereby causing a conflict of time, and the like.

Likewise, to further ensure the elevator riding experience of human passengers, the method may further comprise: sending, to the human passenger in the car assigned to receive the machine passenger, a prompt message indicating an upcoming machine passenger to ride the car, when the call request from the machine passenger is accepted. Such a configuration allows the human passenger to be informed of the upcoming machine passenger before it enters the elevator, thereby making it possible for the human passenger to keep away from the machine passenger or to avoid rushing out of the elevator, so as to avoid a dangerous or uncomfortable experience.

The above examples mainly illustrate the elevator control system, the elevator system, and the control method therefor of the present application. Although only a few of the embodiments of the present application are described, those skilled in the art understand that the present application can, without departing from the spirit and scope of the invention, be implemented in many other forms. Therefore, the illustrated examples and embodiments are to be considered as illustrative but not restrictive, and the invention may cover various modifications or replacements if not departed from the spirit and scope of the present application as defined by the appended claims.

What is claimed is:

1. An elevator control system, comprising:

a data collection unit configured to: receive a call request signal from a machine passenger at each landing, and receive information about the machine to ride the elevator sent by the machine passenger; and a control unit configured to: determine whether to accept the call request from the machine passenger based on the elevator operating condition and the information about the machine to ride the elevator, and send information about the rules of riding the elevator to the machine passenger after accepting its call request;

wherein the control unit is further configured to: determine whether to accept the call request from the machine passenger based on the input information of the particular human passenger, and wherein when the input information of the particular human passenger indicates refusal to ride the elevator together with the machine passenger, the call request from the machine passenger is rejected.

2. The elevator control system according to claim 1, wherein the information about the rules of riding the elevator comprises parking position information for instructing the machine passenger to move to a preset parking position in the car upon entrance, after the call request from the machine passenger is accepted.

3. The elevator control system according to claim 2, wherein the information about the rules of riding the elevator further comprises locking position information for instructing the machine passenger to move to a preset parking position in the car upon entrance and connect with a preset locking device, after the call request from the machine passenger is accepted.

4. The elevator control system according to claim 2, wherein the parking position information comprises a parking identifier for indicating the preset parking position, and the machine passenger moves to the preset parking position in the car according to the instruction of the parking identifier.

5. The elevator control system according to claim 1, wherein the information about the rules of riding the elevator further comprises landing prohibition information for instructing the machine passenger not to leave the car from a preset landing upon entrance, after the call request from the machine passenger is accepted.

6. The elevator control system according to claim 1, wherein the information about the rules of riding the elevator further comprises human passenger high priority information for instructing the machine passenger to enter or leave the car later than human passengers, after the call request from the machine passenger is accepted.

7. The elevator control system according to claim 1, wherein when the car has more than one doors, the information about the rules of riding the elevator further comprises car door indication information for instructing the machine passenger to enter or leave the car via the preset car door, after the call request from the machine passenger is accepted.

8. The elevator control system according to claim 1, wherein the elevator operating condition comprises: a maximum load of the car and a current load of the car, and/or a maximum volume of the car and a current volume of the car, and/or wherein the information about the machine to ride the elevator comprises: size information of the machine passenger and/or weight information of the machine passenger.

9. The elevator control system according to claim 1, wherein when the data collection unit and the control unit are communicatively connected to a plurality of cars respectively, the elevator operating condition further comprises the number of currently available cars that are one or more of: the cars that do not currently carry a passenger, the cars that do not have a human passenger call request at each landing, or the cars that do not have input information of a particular human passenger indicating refusal to ride the elevator together with the machine passenger.

10. The elevator control system according to claim 1, wherein the particular human passenger comprises: a human passenger currently located in the car being called, and/or a human passenger currently calling the same car as a machine passenger.

11. The elevator control system according to claim 1, wherein the machine passenger comprises a transport vehicle capable of controlled autonomous movement or a robot capable of controlled autonomous movement.

12. The elevator control system according to claim 1, wherein the control unit is further configured to: send, to the human passenger in the car assigned to receive the machine passenger, a prompt message indicating an upcoming machine passenger to ride the car, when the call request from the machine passenger is accepted.

13. An elevator system, comprising:

at least one car;

a control machine room; and the elevator control system according to claim 1, wherein the elevator control system is integrally disposed in the control machine room, or the elevator control system is separately disposed in each of the cars and the control machine room.

14. A control method for an elevator system, comprising:

receiving a call request signal from a machine passenger at each landing, and receiving information about the machine to ride the elevator sent by the machine passenger; and determining whether to accept the call request from the machine passenger based on the elevator operating condition and the information about the machine to ride the elevator, and sending information about the rules of riding the elevator to the machine passenger after accepting its call request;

determining whether to accept the call request of the machine passenger based on the input information of the particular human passenger, wherein when the input information of the particular human passenger indicates refusal to ride the elevator together with the machine passenger, the call request from the machine passenger is rejected.

15. The control method according to claim 14, wherein the information about the rules of riding the elevator sent to the machine passenger comprises:

parking position information for instructing the machine passenger to move to a preset parking position in the car upon entrance; and/or landing prohibition information for instructing the machine passenger not to leave the car from a preset landing upon entrance; and/or human passenger high priority information for instructing the machine passenger to enter or leave the car later than the human passenger; and/or car door indication information for instructing the machine passenger to enter or leave the car via a preset car door when the car has more than one doors.

16. The control method according to claim 15, wherein the parking position information further comprises:

locking position information for instructing the machine passenger to move to the preset parking position in the car upon entrance and connect with a preset locking device;

and/or a parking identifier for instructing the machine passenger to move to the preset parking position in the car upon entrance.

17. The control method according to claim 14, wherein the elevator operating condition comprises: a maximum load of the car and a current load of the car, and/or a maximum volume of the car and a current volume of the car; and/or the information about the machine to ride the elevator comprises: size information of the machine passenger and/or weight information of the machine passenger.

18. The control method according to claim 14, wherein when the data collection unit and the control unit are communicatively connected to a plurality of cars respectively, the elevator operating condition further comprises the number of currently available cars that are one or more of: the cars that do not currently carry a passenger, the cars that do not have a human passenger call request at each landing, or the cars that do not have input information of a particular human passenger indicating refusal to ride the elevator together with the machine passenger.

19. The control method according to claim 14, further comprising:

wherein the particular human passenger comprises: a human passenger currently located in a car being called, and/or a human passenger currently calling the same car as a machine passenger.

* * * * *